Aug. 30, 1955     G. M. CRIGER     2,716,500
ARRANGEMENT FOR TRANSFERRING UPRIGHT STACKS
OF BOXES INTO RECLINED POSITION
Original Filed Feb. 14, 1948     4 Sheets-Sheet 3
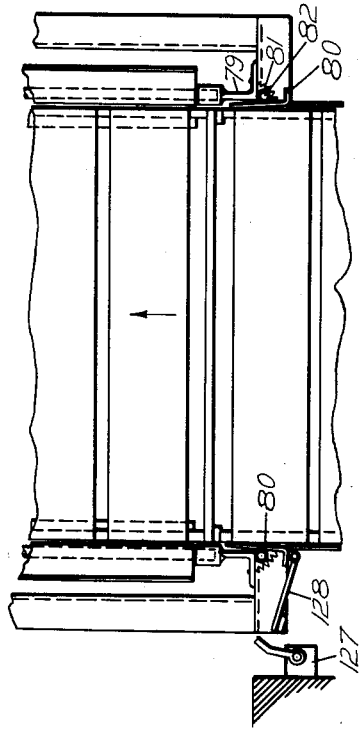
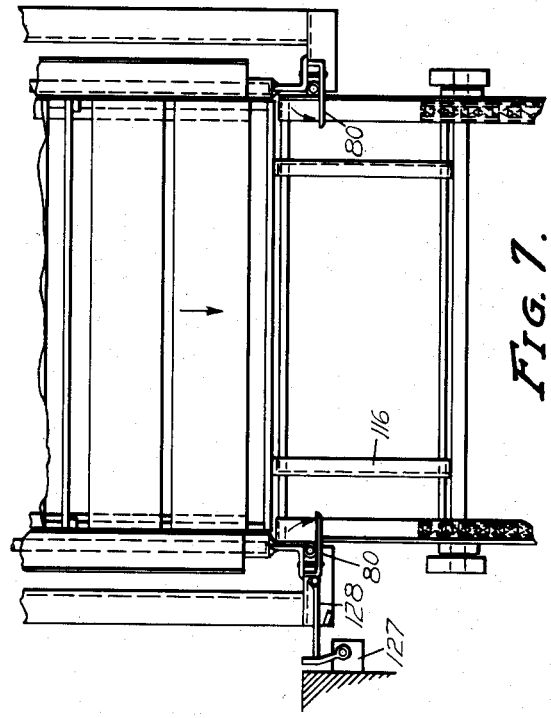
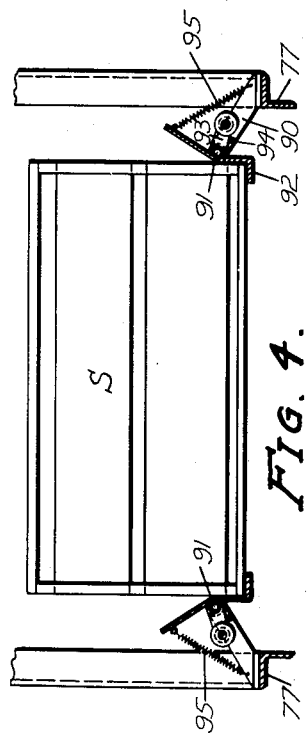
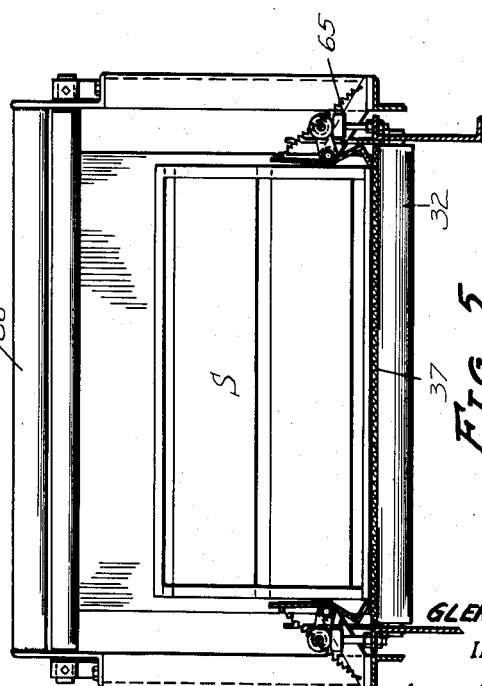
GLENN M. CRIGER
INVENTOR.
BY
ATTORNEY Aug. 30, 1955  G. M. CRIGER  2,716,500
ARRANGEMENT FOR TRANSFERRING UPRIGHT STACKS
OF BOXES INTO RECLINED POSITION
Original Filed Feb. 14, 1948  4 Sheets-Sheet 4
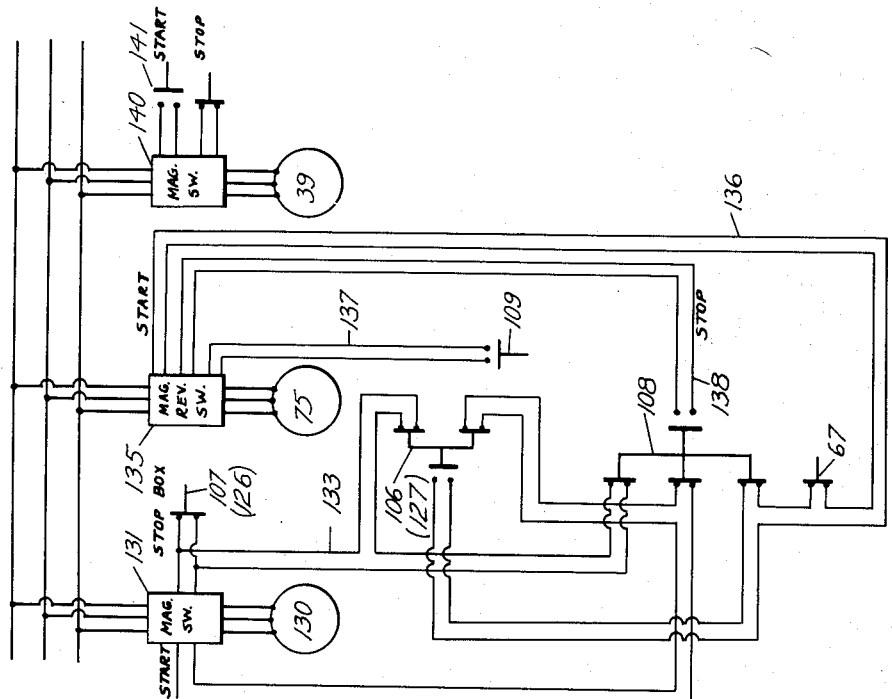
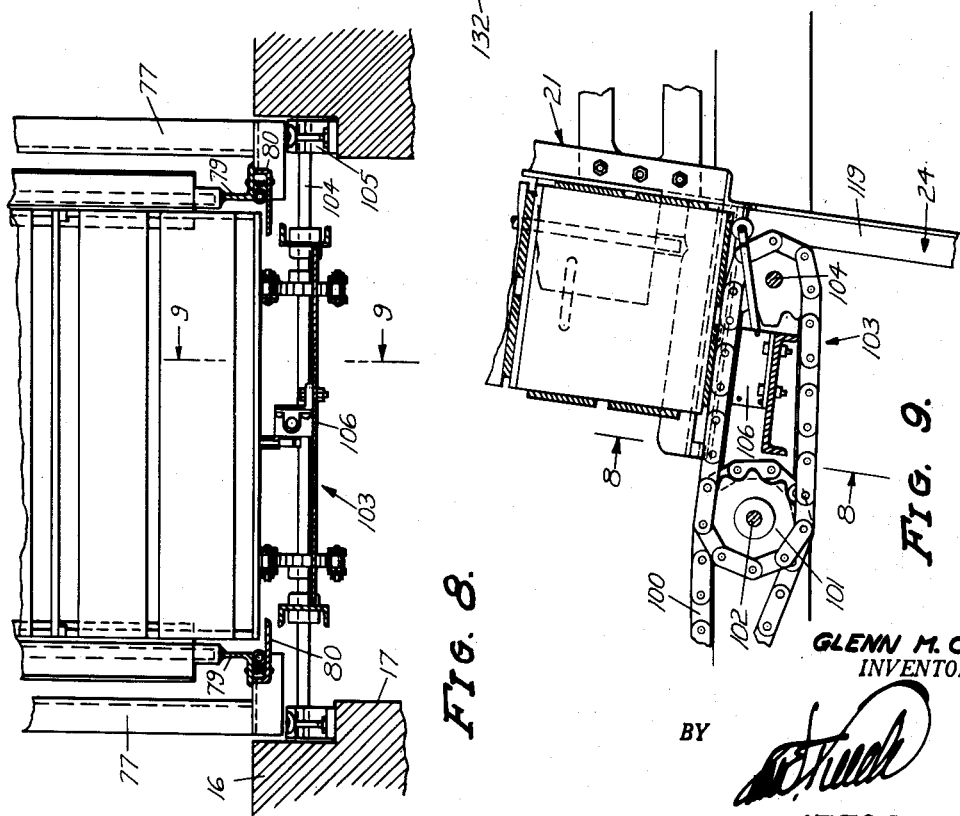
GLENN M. CRIGER
INVENTOR.
BY
ATTORNEY

# United States Patent Office 2,716,500
Patented Aug. 30, 1955

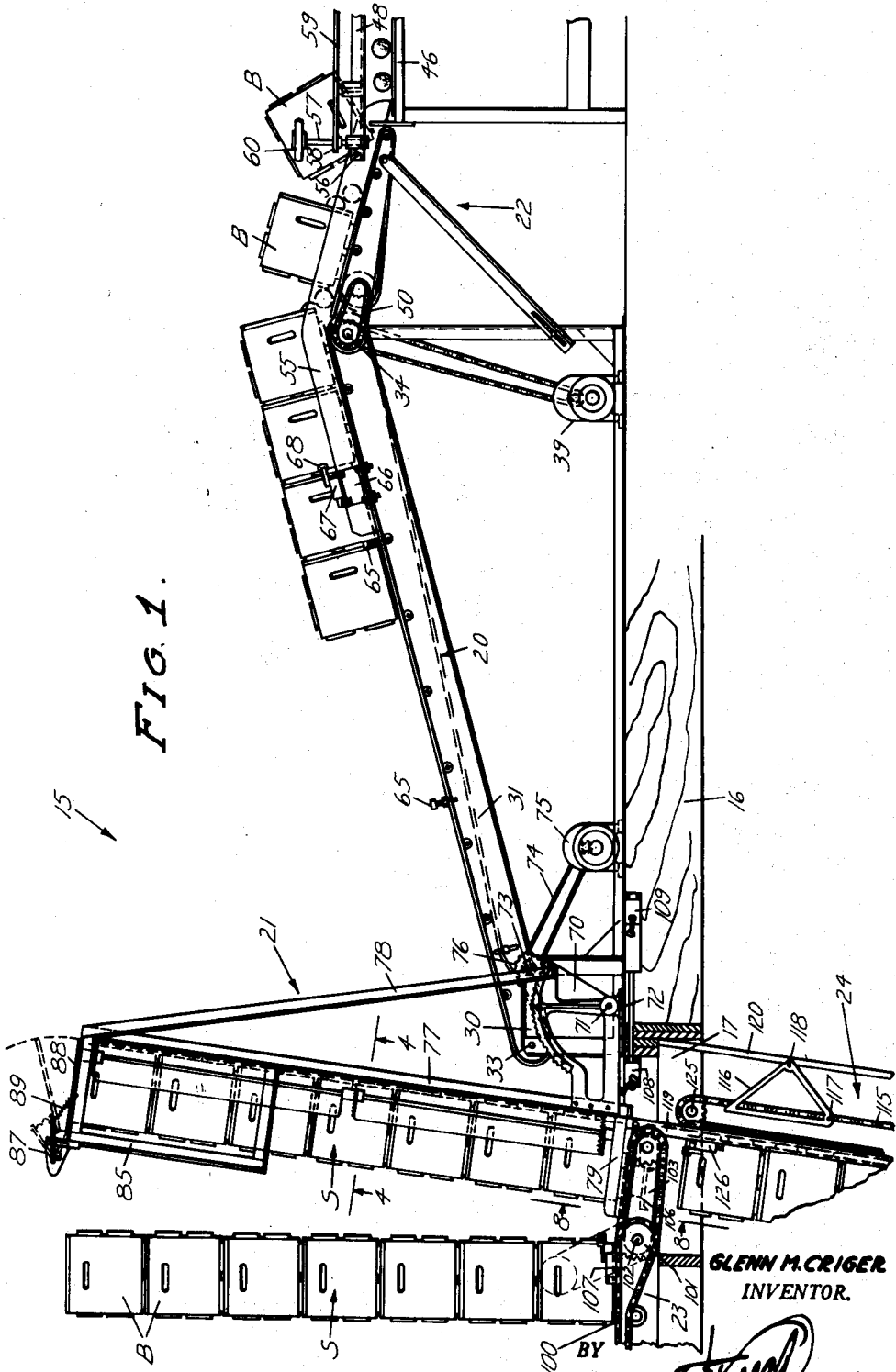

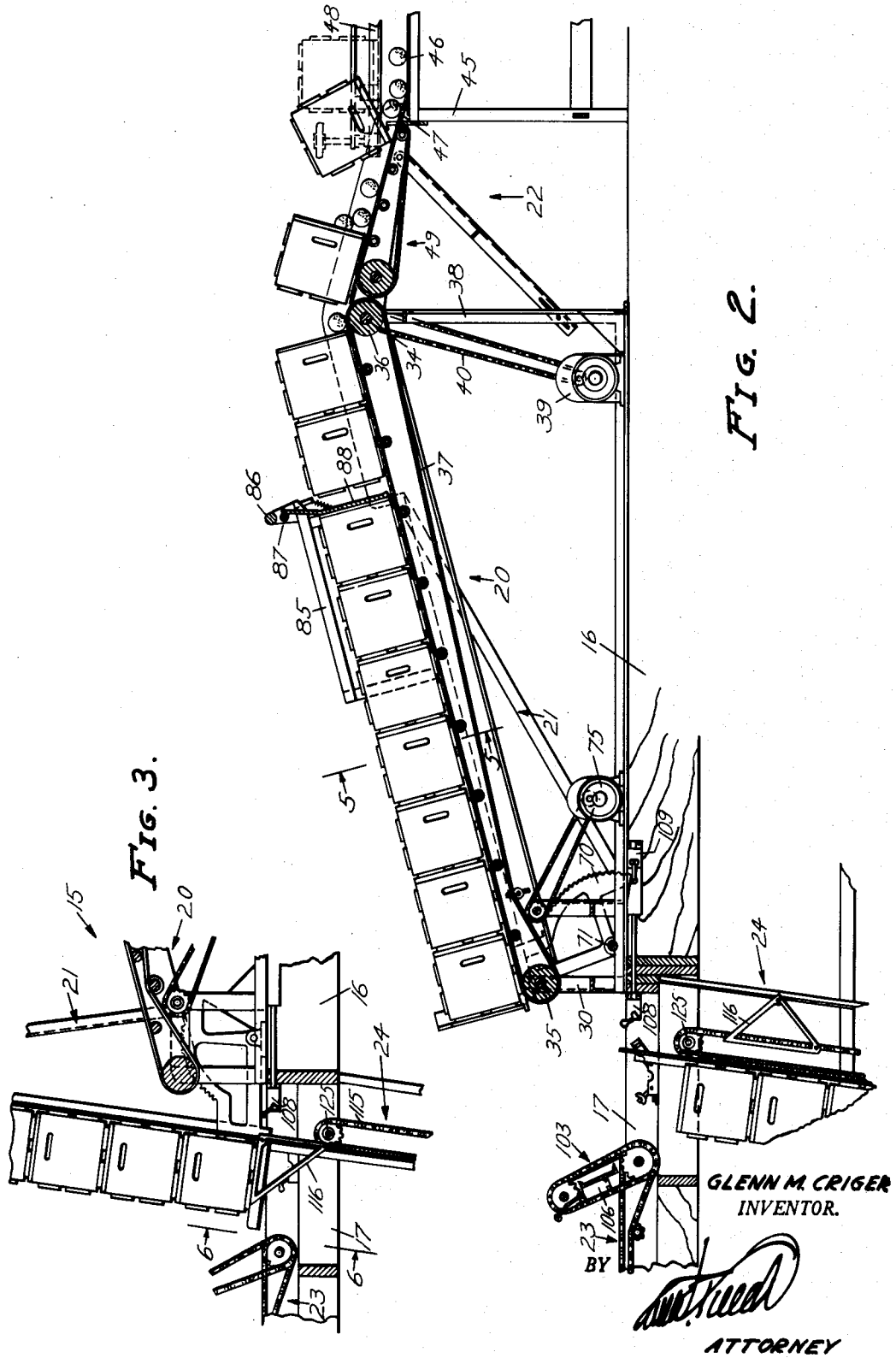

2,716,500

ARRANGEMENT FOR TRANSFERRING UPRIGHT STACKS OF BOXES INTO RECLINED POSITION

Glenn M. Criger, Riverside, Calif., assignor to Food Machinery and Chemical Corporation, San Jose, Calif., a corporation of Delaware Continuation of application Serial No. 8,374, February 14, 1948. This application July 9, 1951, Serial No. 235,765

3 Claims. (Cl. 214—306)

This invention relates to the dumping of the contents from industrial service boxes, such as field boxes, used for carrying fruit from the grove into the packing house.

The practice of stacking field boxes loaded with fruit on the floor of a packing house and handling them thereafter as stacks, has given rise to the wide use of stack dumpers. This is a device which receives an entire stack of boxes and disassembles the stack, dumping the fruit from each box as it is detached from the stack.

It is an object of this invention to provide a novel and efficient stack dumper.

More particularly it is an object of the present invention to provide an efficient arrangement for transferring upright stacks of boxes in lying down position onto the conveyors that supply the actual box dumping apparatus.

Another object is to provide an arrangement, of the type referred to, that is of simple construction and may be operated so swiftly that an uninterrupted procession of boxes may be maintained on the supply conveyor for the box dumping apparatus proper.

Frequently box stackers are mounted on the ground floor of a packing house while fruit is packed for storage both on the ground floor and in the basement.

It is another object of the present invention to provide an arrangement of the type referred to which may be employed optionally to receive stacks for dumping the contents from the boxes thereof, either from the floor on which the dumper is mounted, or from a floor therebeneath.

The manner of accomplishing the foregoing objects as well as further objects and advantages will be made manifest in the following description taken in connection with the accompanying drawings in which:

Fig. 1 is a vertical sectional view taken through a floor and illustrating in side elevation, a preferred embodiment of the invention mounted on said floor. This view shows the stack rocker in its upright position just after it has received a stack.

Fig. 2 is a view similar to Fig. 1 but is taken in a vertical plane extending longitudinally through the middle of the dumper and illustrates the stack rocker just as it deposits a stack on the stack dumping conveyor.

Fig. 3 is a fragmentary view similar to a portion of Fig. 2 with the stack rocker in upright position and illustrating the delivery onto said rocker of a stack from the floor below the floor supporting the dumper.

Fig. 4 is an enlarged cross sectional view taken on the line 4—4 of Fig. 1, illustrating the position of the stack supporting rests in supporting position relative to a stack just delivered to the stack rocker.

Fig. 5 is an enlarged cross sectional view taken on the line 5—5 of Fig. 2 and illustrates the withdrawal of the stack rests from stack supporting position and the delivery of this stack onto the stack dumping conveyor.

Fig. 6 is a view taken in the plane 6—6 of Fig. 3 but showing a stack of boxes being elevated upwardly from the lower floor through stack supporting dogs provided on the lower end of the stack rocker which yield outwardly to permit this stack to pass between said dogs.

Fig. 7 is an enlarged cross sectional view taken on the line 6—6 of Fig. 3 showing a stack elevated as illustrated in Fig. 6 after it has passed between said dogs and is being lowered onto said dogs.

Fig. 8 is an enlarged cross sectional view taken on the line 8—8 of Fig. 1, illustrating the delivery of a stack of boxes horizontally over said stack supporting dogs from the same floor on which the device is mounted.

Fig. 9 is a cross sectional view taken on the line 9—9 of Fig. 8.

Fig. 10 is a wiring diagram of the invention.

Referring specifically to the drawings, a stack dumper 15 is shown therein as mounted on a ground floor 16 of a packing house, the latter having a floor opening 17.

The stack dumper 15 includes a conveyor 20; a rocker 21 for delivering stacks of loaded boxes to the conveyor; a dumper mechanism 22 for receiving boxes, one by one, from the conveyor 20, dumping the contents from the boxes, and separating the contents from the empty boxes; a stack feeder 23 which is mounted on the floor 16 and which is adapted to feed stacks to the rocker 21; and an elevator 24 mounted just below the opening 17 and in alignment with the rocker 21 when the latter is in upright position for optionally delivering a stack to said rocker from beneath the floor 16.

A pair of frames 30 are fastened to the floor 16 and extend upwardly therefrom adjacent the opening 17. The conveyor 20 includes a pair of channel iron side members 31 which support series of rollers 32 and are connected at the lower ends by a shaft 33 which extends through the frames 30 to support this end of the conveyor 20. The other ends of the members 31 have suitable bearings in which a shaft 34 journals, the shafts 33 and 34 carrying conveyor drums 35 and 36 about which are trained a conveyor belt 37.

The upper end of the conveyor 20 is supported on a pair of legs 38. A geared motor 39 mounted on the floor 16 is connected by a chain 40 with the shaft 34. Spaced from the legs 38 is a loose fruit conveyor 45 having a conveyor belt 46 and a stationary drop board 47.

Supported on the conveyor 45 are empty box supporting tracks 48. Supported at its opposite ends, between the upper end of the conveyor 20 and the loose fruit conveyor 45, is a box dumper 49 which slopes sharply from the upper end of the conveyor 20 and is aligned with the drop board 47 for delivering fruit across this board onto the loose fruit conveyor belt 46.

The conveyor 49 is driven by a short chain 50 from the drive shaft of the conveyor 20.

The conveyors 20 and 49 have side boards on which are mounted bearings 56 supporting shafts 57, having sprockets 58 about which are trained box propelling chains 59, there being rubber tired wheels 60 provided on the upper ends of the shafts 57 for a purpose which is illustrated in Fig. 1.

Mounted on the side members 31 of conveyor 20 are vertically adjustable stack rest retracting pushers 65. One of these members carries a bracket 66 on which is mounted a switch 67. Switch 67 has an arm 68 which extends inwardly over the belt 37 into the path of a stack of boxes being conveyed upwardly on said conveyor belt.

The rocker 21 includes a pair of gear sectors 70 mounted on a shaft 71 fixed in suitable bearing blocks 72 which are fastened to the floor 16.

The frames 30 have suitable bearings in which is journaled a shaft 73 which is connected through a chain 74 to the rocker drive motor 75, shaft 73 having gears 76 which mesh with the gear sectors 70 for applying power thereto in rocking the rocker 21.

Secured to each of the sectors 70 is an angle iron frame member 77 which is braced by an angle member 78 which connects the outer end of member 77 with the forward end of said sector. Provided on the lower ends of the members 77 are angle iron feet 79 which turn outwardly and have stack supporting dogs 80 pivotally fixed to said feet and held yieldably in inwardly extended positions by springs 81. These springs permit these dogs to yield up and outwardly, however, about pivots 82 which connect these dogs to the feet 79 as shown in Fig. 6.

The members 77 have side frames 85 which are connected at their upper edges by a cross bar 86 and have a shaft 87 journaled between the frames 85, this shaft carrying an uppermost box cover 88 which is yieldably held in box covering position by a spring 89. Provided on the members 77 (see Figs. 4 and 5) are inwardly extending arms 90 which are apertured at their inward ends to receive pivot pins 91 for pivotally mounting rockable stack rests 92. These stack rests have roller arms 93 which are yieldably held against pins 94 by springs 95. The rests 92 support an increasing portion of the stack as the rocker 21 is being rocked by the motor 75 towards its reclining position. When the rocker reaches a position closely above and parallel to the upper run of the dumping conveyor 20, the previously described pushers 65 engage the roller arms 93 and swing the stack rests 92 about the pivot pins 91 against the action of the springs 95. Thus, the stack rests 92 release the boxes within the rocker 21 and deposit them simultaneously upon the dumping conveyor 20.

The stack feeder 23 includes endless floor chains 100 which are driven by sprockets 101 fixed on a shaft 102, this feeder being mounted on the floor 16. Pivoted on this shaft is a short extension stack conveyor section 103 which may be swung upwardly and rearwardly out of the way as shown in Fig. 2, or downwardly for feeding a stack to the rocker 21 as shown in Figs. 1, 8 and 9.

The conveyor section 103 has a shaft 104 at its forward ends which rests in clamps 105 provided on the floor 16 at the edge of the floor opening 17 when the section 103 is lowered. This section has a switch 106, the purpose of which will be made clear hereinafter.

Switch 107 is also provided on the floor 16, alongside the path of stacks carried on the floor chains 100. The purpose of this switch will be made clear hereinafter.

Switches 108 and 109 are also provided on the floor 16 in position to be engaged by the rocker 21 in its upright and reclining positions respectively.

The elevator 24 is preferably of the type shown in U. S. Letters Patent to James W. Stevenson, No. 2,365,782, issued December 26, 1944, and includes a pair of endless chains 115 having two or more triangular stack supporting platforms 116, each of which has laterally projecting pins 117 and inwardly projecting pins 118. This elevator also has upright guides 119 for the pins 117 and 118 while these are rising, and upright guides 120 for the pins 118 while these are descending.

At the lower end of the elevator 24 is a bar (not shown) which is engaged by the stack platforms 116 as they descend, which rocks these into stack receiving position at the bottom of the elevator.

At the upper end of the elevator 24, the chains turn about a shaft 125 which rocks the platforms 116 out of the stack elevating path and with the pins 118 bearing against the guides 120.

Mounted on one of the guides 119 is a switch 126 which is actuated by the arrival of the uppermost box of a stack at the level of the switch.

Mounted on the floor 16 in the opening 17 is a switch 127 which is normally closed but which is opened when a stack has been fed to the rocker 21 from the elevator 24 by engagement therewith of a pusher 128 pivotally connected to the adjacent dog 80.

Operation

The operation of the stack dumper 15 of the invention is as follows:

Assuming in the first instance that stacks S of boxes B are being fed along the feeder chains 100 on the floor 16 to the dumper, the conveyor section 103 will be turned downwardly as shown in Figs. 1, 8 and 9, and the rocker 21 will be in upright position as shown in Fig. 1.

The motor 39 is energized so as to run the conveyor 20, box dumper 22, loose fruit conveyor 45 and empty box removing chains 59 continuously.

The feeder 23 is driven by a separate motor 130 which is controlled by a magnetic switch 131, the start circuit 132 of which is controlled by the switches 106 and 108 and the stop circuit 133 of which is controlled by switches 106, 107 and 108 (see Fig. 10).

The motor 75 is controlled by a magnetic reversing switch 135, the start circuit 136 of which is controlled by switches 67, 106 and 108, the reverse circuit 137 of which is controlled by switch 109, and the stop circuit 138 of which is controlled by switch 108.

The motor 39 is controlled by a magnetic switch 140 through a simple start-stop switch 141.

With respect to the starting circuit of the motor 130, the switches 106 and 108 are normally closed, causing the feeder 23 to operate to feed stacks along the floor 16 towards the rocker 21. With respect to the stop circuit 133 for the feeder motor, the switches 106, 107 and 108 are normally closed.

Thus, when the rocker 21 is empty, engagement with the switch 107 by an advancing stack does not serve to stop the feeder but the latter continues operating until it has fed a stack into the rocker 21.

The stack, thus delivered to the rocker 21, opens the switch 106 as to the stop circuit 133 and as to the start circuit 132 and closes it as to the start circuit 136 of motor 75.

Assuming this is the first stack to be fed to the rocker 21 during the current operation under discussion, and that a following stack is opening switch 107, the switch 67 is already closed and while the switch 108 is closed with respect to stop circuit 133, the closing of the starting circuit 136 by the switch 106 starts the motor 75 to rock the rocker 21 from its upright position to its reclining position. When the rocker 21 reaches a position closely above and parallel to the conveyor 20 the pushers 65 engage the roller arms 93 so that the stack rests 92 on the rocker 21 are immediately withdrawn from stack supporting position.

The switch 108 is thus opened as to the circuits 132, 133 and 136 by the initiation of this rocking movement of the rocker 21, and simultaneously therewith, is closed as to the stop circuit 138 of motor 75. Now, when the rocker 21 engages the switch 109, it reverses the motor 75. Since the stack rests 92 have been retracted, and the stack of boxes thus freed from the rocker 21, the motor 75 may return the now empty rocker immediately toward its upright position.

The motor 75 continues to operate in reverse until the rocker 21 is returned to its upright position in which it engages the switch 108 to open the holding or stop circuit 138 of the magnetic switch 135, thus stopping the motor 75 and halting the rocker 21 in its upright position.

This actuation of the switch 108 closes it as regards the start circuit 132 and stop circuit 133 of the feed motor 130. Lifting of the stack from the switch 106 having caused the latter to return back to normal as shown in Fig. 10, this actuation of switch 108 causes the starting of the motor 130.

In the same manner as above described, another stack is now fed from the feeder 23 to the rocker 21. Switch 67 having been opened by the stack delivered onto the conveyor 20, however, the stack thus delivered to the rocker merely actuates the switch 106 with no results until the stack on the conveyor 20 disengages the switch 67, allowing this to close. When the latter happens, the starting circuit 136 is closed, resulting in the energizing of the rocker drive motor 75 to initiate another rocking reciprocation of the rocker to deliver the second stack to the conveyor 20.

In the manner above described, the stack dumper 15 continues automatically to deliver stacks of filled boxes from the feeder 23 to the rocker 21 which, in turn, automatically delivers these stacks to the dumping conveyor 20 immediately upon room being available for a stack on the latter.

For simplification, the wiring diagram, illustrated in Fig. 10, is limited to that employed for operating the stacker 15 with stacks of boxes from the feeder 23. The electrical system of the stacker 15, however, includes means (not shown) for cutting out switches 107 and 106 and substituting in their respective places in the system shown in Fig. 10, the switches 126 and 127, and also switching the leads to motor 130 to the motor (not shown) of the elevator 24.

When the system shown in Fig. 10 is thus altered, the elevator 24 is controlled in exactly the same manner as above described for the stack feeder 23. Under the provisions of this control, a stack may not be fed upwardly past the switch 126 when the rocker 21 is not in upright position and empty.

When a stack is fed from the elevator 24 to the rocker 21, the upper box engages the dogs 80 and swings these outwardly as shown in Fig. 6. This withdraws the pusher 128 from on top of the arm of the switch 127 to a position of readiness in which it is shown in Fig. 6.

When the bottom box of the stack passes upwardly out of contact with the dogs 80, these are returned to their normal condition by springs 81 as shown in Fig. 7. This causes the pusher 128, connected to one of the dogs 80, to engage and actuate the switch 127. Occupying, as this switch does, the same place in the electrical system as switch 106, this actuation of switch 127 readies the system for the initiation of a rocking cycle of the rocker 21 as soon as switch 67 is closed by the lowermost box on the conveyor 20 riding upwardly out of contact with this switch.

When the switch 67 closes, the motor 75 is started to initiate a rocking cycle of the rocker 21 which continues to its conclusion in the same manner as above described where the system is being employed for receiving stacks by way of the conveyor 23.

As this rocking cycle is started, the pusher 128 moves out of contact with the arm of the switch 127, thus allowing this to return to normal in the same manner that the initiation of such a cycle causes the switch 106 to return to normal when receiving stacks from the floor 16.

When the rocker 21 returns to its upright condition empty, the pusher 128 comes to rest on top of the arm of the switch 127 where it remains until a stack is delivered upwardly to the rocker from the elevator 24 with the resulting retraction of the pusher 128 as shown in Fig. 6.

The switch 126 operates to stop the conveyor 24 whenever the rocker 21 is in upright position and empty at the time the upper end of a stack being lifted on the elevator 24 engages the switch 126.

It is thus seen that the present invention provides a novel and efficient stack dumper which may be employed optionally to receive stacks from a feeder conveyor located on the same floor as the stacker itself, or from an elevator delivering stacks upwardly from a floor thereunder.

This is a continuation of United States patent application Serial Number 8,374, filed on February 14, 1948, and now abandoned, for a Box Stack Dumper.

What I claim and desire to protect by Letters Patent is:
1. Arrangement for transferring a stack of boxes from an upright to a reclined position for delivery to a box dumping mechanism comprising in combination an inclined conveyor adapted to receive a stack of boxes in reclined position and deliver them upwardly to the box dumping mechanism; a rocker having an elongated frame and a ledge provided at one end of said frame and extending substantially at right angles thereto, said rocker being pivotally mounted adjacent the lower end of said conveyor for movement from a substantially upright initial position in which said ledge is adapted to support a stack of boxes in upright condition to a second position wherein said frame is parallel to and closely above said conveyor, said frame defining an opening of sufficient size to permit the passage of said stack therethrough; gate means pivotally supported from said frame; spring means engaging said gate means in a manner effective to enable said gate means to support a stack of boxes as said rocker is reclined into said second position; and means effective, upon said rocker reaching said second position, to retract said gate means against the urgency of said spring means so that the entire stack may simultaneously drop through said frame onto said conveyor and said rocker may return past the dropped stack to its initial position.

2. An arrangement according to claim 1 comprising first means operable upon delivery of a stack of boxes into said rocker in its first position to swing said rocker from said first to its second position, second means operative upon arrival of said rocker in said second position to swing said rocker back to its first position, and third means effective in the presence of boxes on said conveyor in the space below said frame in its second position to disable said first means.

3. Arrangement for transferring a stack of boxes from upright to reclined position, including a support adapted to receive a stack of boxes in reclined position; a rocker comprising an elongated frame, a shelf pivotally secured to said frame at one of the narrow ends thereof, said rocker being mounted adjacent to said support for rotation about a horizontal axis from a first position wherein its frame extends in a substantially vertical direction with said shelf located at the bottom end thereof to a second position wherein said frame is disposed parallel to and closely above said support; and retractable means provided on said frame and effective to support a stack of boxes in reclined position on said frame when said frame is in a reclined position; means effective upon said frame reaching said second position to cause retraction of said retractable means to deposit a stack of boxes from said rocker onto said support; means yieldably holding said shelf in a position transversely of said frame and adapted to support a stack of boxes in upright condition yet permitting said shelf to yield in upward direction; stack feed means operable to deliver upright stacks of boxes in a substantially horizontal direction into said rocker onto said shelf thereof; and optional feed means disposed below the bottom end of said rocker in said first position thereof and operable to deliver stacks of boxes upwardly against and past said yieldable shelf into said rocker.

References Cited in the file of this patent
UNITED STATES PATENTS

| | | |
|---|---|---|
| 1,292,636 | Parker | Jan. 28, 1919 |
| 1,676,957 | Leaver et al. | July 10, 1928 |
| 1,878,994 | Abbe | Sept. 27, 1932 |
| 2,127,007 | Paxton | Aug. 16, 1938 |
| 2,172,685 | Thompson | Sept. 12, 1939 |
| 2,329,413 | Neja | Sept. 14, 1943 |
| 2,424,252 | Orlando | July 22, 1947 |
| 2,520,252 | Mutchler | Aug. 29, 1950 |